United States Patent [19]

Harrison et al.

[11] 4,068,858
[45] Jan. 17, 1978

[54] BICYCLE

[75] Inventors: George Harrison, Berwyn; Nelson Harrison, Riverside, both of Ill.

[73] Assignee: Nelson K. Harrison, Berwyn, Ill.

[21] Appl. No.: 647,912

[22] Filed: Jan. 9, 1976

[51] Int. Cl.² .............................................. B62N 00/00
[52] U.S. Cl. .................... 280/289 R; 40/590;
403/290; 403/370; 280/279
[58] Field of Search .............. 40/2.2, 330, 320, 129 C;
403/290, 374, 370, 104; 280/289 R, 279

[56] References Cited
U.S. PATENT DOCUMENTS

| 575,910 | 1/1897 | Sherman | 40/2.2 |
|---|---|---|---|
| 1,032,930 | 7/1912 | Moseley | 40/2.2 X |
| 1,473,556 | 11/1923 | Iafrate | 40/129 C X |
| 2,770,479 | 11/1956 | Hilber | 403/374 |
| 3,787,126 | 1/1974 | Arlen | 403/104 |
| 3,874,701 | 4/1975 | Soong | 403/374 |

FOREIGN PATENT DOCUMENTS 451,436   11/1912   France ................................ 40/2.2

Primary Examiner—Joseph F. Peters, Jr.
Assistant Examiner—Donn McGiehan
Attorney, Agent, or Firm—Morris Spector

[57] ABSTRACT

A bicycle handlebar stem is made of two separate parts, a tubular shank and a gooseneck. This eliminates or substantially reduces long drilling operation for the stem and it simplifies the forging of the gooseneck. The gooseneck is shaped for forging thereof in a manner such that the meeting of the forging dies does not occur across the top of the stem, and the forging operation can forge identifying insignia on the stem top and/or form a recess of receiving an identification plate. Destruction of the indicia on the plate in the case of a stolen bicycle is easily detected. In order to inhibit commerce in such stolen bicycles the handlebar stem is mounted in the steering column in a manner that requires a special tool to remove it and to replace it by another.

9 Claims, 9 Drawing Figures

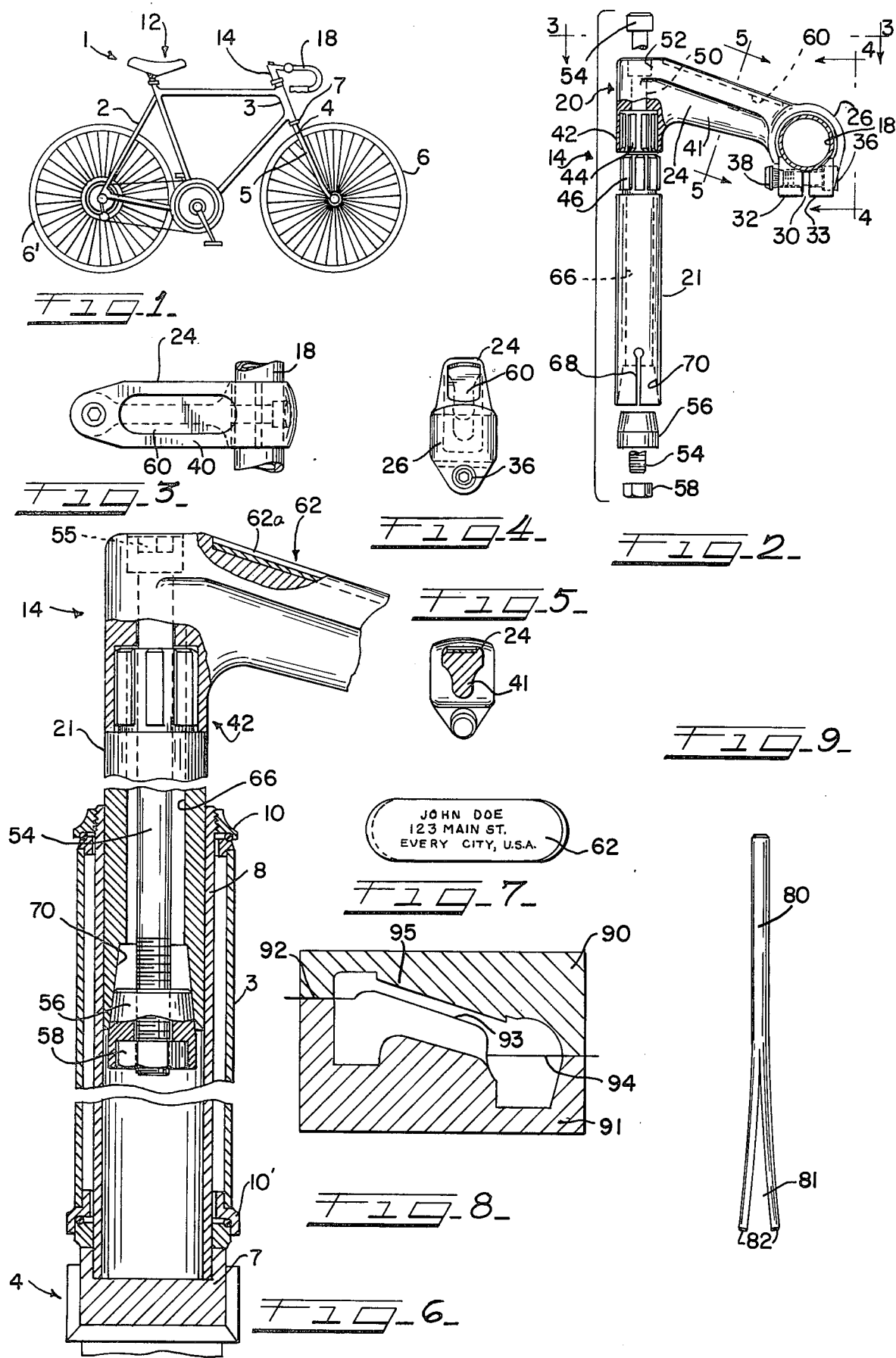

BICYCLE

This invention relates to bicycles and more particularly to the construction and means for mounting of the handlebar-receiving gooseneck.

It is one purpose of this invention to provide a bicycle which will display information such as the manufacturer's name, as for advertising or like purposes, or the owner's name for identification purposes, in a place easily and quickly noticeable. The handlebar receiving gooseneck of the bicycle is an ideal spot for that identification. It is a further purpose of this invention to provide a bicycle wherein the handlebar-receiving gooseneck cannot be easily removed and replaced without the use of special tools, tools that a petty thief is not likely to have, This inhibits theft, and increases the likelihood of recovery if the bicycle is stolen.

In a bicycle the top side of the handlebar stem is gooseneck shaped and is a prominently part of the bicycle when it is parked in a row of bicycles. In general this part is round or curved in section and therefore not particularly adapted to display a trademark or other information. The handlebar gooseneck of the present design is a forging. The forward projecting arm which has at its end the screw operated clamp that secures the handlebar is a "T" section as wide on its top as the clamping boss is wide. In the flat top of the "T" there is formed a depression to receive a plate which will bear certain desired information, such as the name and address of the bicycle's owner. This plate is held in the depression by a heat degradable adhesive. Before delivery of the bicycle to the purchaser, the purchaser's name, address, and other information to identify the bicycle owner is engraved in the depression. The engraved plate bearing the same information conceals the information in the base of the depression. The engraved surface of the plate is flush with and forms a continuation of the top surface of the stem to look like one piece with it and thereby discourage attempts to remove it. A bicycle thief is thus inclined to mutilate it. That constitutes an indication of a theft. Thereafter if the bicycle is recovered by the police or by an authorized dealer, the mutilated plate can be removed to ascertain the ownership from the information in the depression in the top of the stem.

A thief might seek to enable sale of the stolen bicycle by replacing the tell-tale bicycle stem. To thwart such efforts the construction is made such as to require a special tool to remove the bicycle stem or a special tool to reinsert the same or a different bicycle stem. A bicycle stem of the type here involved is held in adjusted position by wedging the base of the stem in the steering column that is at the top of the bicycle fork. A wedge bolt reaches from the top of the handlebar stem for manipulating the wedge. In the prior art structure the wedge bolt threads into a tapped hole in the wedge. There the wedge is released by turning the bolt a sufficient amount in the release direction and then striking a sharp blow on the top of the wedge bolt to submit a sharp force thru the bolt to the wedge to move the wedge in its release direction. Later the same or a different bicycle stem can be inserted. It is an object of this invention to make the wedging arrangement between the handlebar stem and the steering column more difficult of removal or replacement without special tools, to discourage the use of stolen bicycles. To accomplish this, we eliminate the threads in the wedge and permit the wedge bolt to slide through the hole in the wedge without exerting a releasing force thereon. The bottom of the wedge is arranged to receive and hold a square or other non-circular nut against rotation but to permit axial sliding movement of the nut away from the wedge. This nut is threaded of pitch and size to receive the threaded end of the long wedge-bolt, so that upon turning of the wedge bolt the non-rotatable nut is moved axially. Loosening of the bolt moves the nut free of the wedge inside the steering wheel fork until it ultimately drops from the bolt. The wedge bolt can then be lifted out, leaving the handlebar stem wedged in the steering column. To remove the stem, the bicycle will have to be taken to the bicycle dealer who has a special tool for that purpose.

Serious bicycle accidents frequently involve a great impact against the handlebar structure and the gooseneck supporting the same. In the prior art, such an accident often leaves a broken gooseneck. When the legal question of the liability for the accident arises, there is frequently a conflict of opinion as to whether the accident caused the breaking or the breaking caused the accident. It is customary to make these bicycle parts of a metal that is ductile, i.e., a forging, so that in such accident the gooseneck may bend and twist, but it will not break, thus leaving evidence that it was not a defect of the gooseneck that caused the accident.

In the manufacture of parts of the handlebar gooseneck it is made as a forging. Since the top of the handlebar stem is to have a depression in it to receive the identification data above set forth, or shall have identification data thereon, the gooseneck forging of the present invention is shaped to permit forging of a preform by movement of the forging dies directly toward or from the top surface of the handlebar stem. Thus the top forging die can form the insignia-receiving depression or the manufacturer's trademark or the like directly on the surface. Also by this arrangement, and that is an important part of this invention, the parting line between the relatively moveable forging dies is on what will be the side of the forging when the forging is in its assembled position on the bicycle rather than on the front thereof, thereby minimizing finishing.

The attainment of the above and further objects of this invention will be apparent from the following specification taken in conjunction with the accompanying drawings forming a part hereof.

BRIEF DESCRIPTION OF THE DRAWINGS

FIG. 1 is a side view of a bicycle embodying this invention;

FIG. 2 is an enlarged side view of the handlebar stem with the parts thereof shown in exploded relationship;

FIG. 3 is a top view of the handlebar stem taken along the line 3—3 of FIG. 2;

FIG. 4 is an end view of the handlebar stem taken along the line 4—4 of FIG. 2;

FIG. 5 is a cross sectional view of the handlebar stem taken along the line 5—5 of FIG. 2 and looking in the direction of the arrows;

FIG. 6 is a cross sectional view showing the handlebar stem in position with the steering column in the head tube of a bicycle frame;

FIG. 7 is a top view of an identification plate;

FIG. 8 is a cross section thru a pair of forging dies used for making the handlebar gooseneck; and FIG. 9 is a side view of a wedge release tool.

DESCRIPTION OF THE PREFERRED EMBODIMENT

Referring now to the drawings, a structure embodying the present invention is shown incorporated in a bicycle 1 having a standard frame 2 that includes a front head tube 3 that receives the standard front bicycle wheel fork 4 the lower end 5 of which is bifurated to receive a front wheel 6 constituting a standard bicycle front wheel construction. The rear portion of the frame receives a rear bicycle wheel 6' which is driven by the usual pedal arrangement. The top of the bifurated end 5 of the fork has a crown 7 from which a tubular steering column 8 extends into and through the head tube 3, being rotatable in the head tube and held against longitudinal sliding by an upper ball bearing assembly held by a cap 10 and a lower ball bearing assembly held by a cap 10'. The lower ball bearing assembly rests on the crown 7 which limits the upward movement of the steering column 8 into the head tube while the threaded upper cap 10 holds the steering column against downward longitudinal movement into the head tube, while permitting rotary movement of the steering column 8 as is standard in bicycle construction.

A handlebar mounting member or stem 14 of the present invention is mounted in the steering column in a manner to be more fully set forth. It is positioned forwardly of the driver's seat 12 as is usual in bicycle construction.

The handlebar mounting stem 14 supports a standard bicycle handlebar 18.

The handlebar mounting member 14 is essentially a gooseneck structure 20 and a tubular stem 21 that are formed as two separate parts and after fabrication of each, they are irremovably assembled together. The gooseneck structure 20 includes a bar portion or shank 24 which is T-shaped in cross section and has at one end a handlebar sleeve 26 of standard construction through which a tubular handlebar 28 is slid, said sleeve being slotted at 30 to leave two ears 32-33 that may be drawn together by a nut and bolt arrangement comprising a clamp screw 36 that passes through the ears and receives a threaded stud 38 for tightening the sleeve 26 on the handlebars, all as is standard in bicycle construction.

The shank 24 has a smooth upper surface 40. It also has a lower reinforcing rib 41. Opposite the sleeve 26 the shank terminates in a circular socket 42 which is smooth at its exterior surface. Its bore has a number of uniformly spaced splines 44. The socket is adapted to receive the upper end of the tubular stem 21, said stem having for this purpose a similar number of splines 46 that fit snugly between the splines 44 in the socket 42. The tubular stem 21 is secured against retraction from the socket by a suitable adhesive applied thereto before insertion into the socket. This makes the gooseneck 20 integral with the stem 21 to constitute the handlebar mounting member.

The gooseneck 20 has a bore 50 therethrough terminating at its upper end in a counter-bore 52, for receiving a wedge bolt 54 that extends through the gooseneck and through the tubular stem 21 to the bottom thereof and through an unthreaded bore in a wedge member 56 and receives a nut 58, for a purpose to be more fully set forth as this description proceeds. The upper surface 40 of the shank 24 has a recess 60 formed therein. The recess receives an identification plate 62 illustrated in FIG. 7 which is the same shape as that of the recess and which has engraved on its outer surface identification data, in this instance the name and address of the owner of the bicycle. Before placing the plate into the recess 60, the bottom surface of the recess is engraved with the same identification data. The identification plate is then cemented into the recess 60 by means of a cement that is heat degradable at a temperature in excess of 200° F. so that the plate can be removed by heating the same to a temperature sufficient to destroy the bonding power of the cement or adhesive. The top surface of plate 62 is below the adjacent surface of the top 40 of the shank 24.

The tubular stem 21 has an internal bore 66 through which the wedge bolt 54 extends as previously stated. The lower end of the tubular stem 21 has an axial slot 68 to facilitate radial expansion or spreading of the lower end of the stem 21 when the wedge 56 is forced upwardly into the stem. To accomplish that spreading action, the lower end of the bore 66 terminates in a tapered counter-bore 70 that will be engaged by the wedge 56 and can be moved axially into the stem. The nut 58 is threaded onto the lower end of the wedge bolt 54 until the nut enters a circular cavity, in which the corners of the nut make a tight fit in the bottom of the wedge 56, that prevents the nut from turning in the cavity so that the wedge and nut can no longer rotate with respect to one another. The wedge rests on the nut. By drawing the wedge bolt upwardly, the wedge 56 is now moved into engagement with the tapered surface 70 at the bottom of the stem. Thereafter, further turning of the wedge bolt brings the head of the wedge bolt into seating position within the counter-bore 52. Further descent of the wedge bolt 54 is not possible and therefore further turning of the wedge bolt 56 causes the wedge to rise upwardly to expand the tapered surface 70 at the bottom of the stem 21 to bring the outer bottom of the stem 21 into firm pressure engagement with the inner surface of the steering column 8 of the bicycle fork 4. This positively locks the handlebar mounting member 14 to the steering column for manipulation of the steering column.

As indicated in the drawings, the identification plate 62 is disposed in the recess 60 with the data bearing side thereof facing upwardly so that the identification is exposed to be readily visible. preferably the recess is of sufficient depth to disclose the identification insignia on the plate 62 below the surrounding edge of the top surface 40 of the bicycle stem. The identification plate is thus recessed mounted within the recess 60. This is important because attempted removal of the data from the plate 62 when the plate is in its mounted position by grinding, chisling or the like, is thus made difficult and cannot be readily achieved without mutilating or destroying either the identification plate 62 or the adjacent portions of the handlebar mounting member. The police authorities or the bicycle merchant would know that beneath the plate 62 there is similar identification data and by heating the plate the adhesive breaks down, permitting removal of the plate and consequently revealing the subjacent identification.

The handlebar mounting member is preferably formed so that when mounted in the bicycle frame its shank 24 is substantially horizontal and the surface 40 thereof faces upwardly and at a level above the connection that the handlebar sleeve 26 makes with the shank 24. The identification plate thus has its exposed side facing upwardly at a convenient disposed level and located below the top of the recess 60 leaving a surrounding shoulder 62a, so that an attempt to remove the plate or to grind away or otherwise deface the identification data would, most likely deface or mar the adjacent surrounding surface 60 and the results of such attempts would be readily visible to one glancing at this portion of a bicycle, even when the bicycle is one of a row of bicycles in a rack.

Furthermore, when a bicycle equipped with the present identification insignia which has been tampered with is parked side by side with other bicycles in a usual bicycle parking stand, the location and upwardly facing relation of the identification plate 62 associated therewith is exposed to even casual inspection by a police officer checking the bicycle stand for suspected stolen bicycles. Any indication of tampering with the identification data on any bicycle is a quick give-away of the possibility that the subject bicycle may have been stolen.

A bicycle thief having, unsuccessfully tampered with the identification data might then try to make his stolen product merchantable by completely removing the bicycle stem 14 from the bicycle frame with a view of replacing the same by another. He may attempt to do this by unscrewing the wedge bolt 54. When that is done the nut 58 will ride downwardly on the rotating wedge bolt and move away from the wedge 56, ultimately dropping off of the wedge bolt 54, but leaving the wedge 56 in its wedging position with the tapered surface 70. Removal of the wedge bolt 54 will not of itself permit removal of the bicycle stem 14 from the steering column.

Should the legitimate owner of the bicycle wish to adjust the position of the handlebar mounting member 14 within the steering column, it is necessary for him to take the bicycle to the authorized dealer who is prepared to do this. The authorized dealer would remove the wedge bolt 54 in the usual manner and then insert in its place a tool 80 in the bore 50. That consists of a rod of the same diameter as that of the wedge bolt and circular in cross section. The bottom of the tool 80 is slit at 81, and the ends spread apart to form two separating tines 82-83. After the bottom of the tool reaches the bottom of the bore 50 further advance will permit the tines 82 to expand. When the bottom of the tool reaches the tapered bore at the bottom of the tubular stem 21 it expands along the tapered column and comes into engagement with the top surface of the wedge member 56. A sharp hammer blow at the top of the tool 80 will force the wedge downwardly and out of engagement with the tapered surface 70 of the tube stem 21, permitting the removal of the gooseneck 20 with its connected stem 21.

The tubular stem 21 is made of material which is extruded. The amount of machining required to make this tube is minimal. The gooseneck 20 is preformed of any suitable material that can be forged to give it requisite ductility as is common in the fabrication of bicycle stems. The forging operation to bring it into its necessary shape is facilitated by the fact that the forging is performed before it has been assembled with the tube 21. It is forged between an upper forging die 90 and a lower forging die 91 as illustrated in FIG. 8. The handlebar sleeve 26 and the socket 42 are so arranged that the lower die can form the lower part of the casting while the upper die forms the upper part of the casting, with the meeting line between the two dies, indicated at 92, 93 and 94, entirely at the portions of the castings which are the side thereof when the bicycle is upright. There is no parting line of the dies extending across the top of the casting that is being forged. As a result there is no forging flash formed across the top of the forged product, a place where flash is objectionable and would have to be removed. In addition, the upper forging die can and does have a projecting portion 95 that is shaped to form the recess 60 in the top of the die. This feature is of importance not only in the case of a forging that is to have a recess formed in the top thereof, but if no plate-receiving recess is desired, then the projection 95 in the upper die 90 can be shaped as desired to form a trademark or the like.

The required dies, such as shown in FIG. 8, may be mounted in a standard forging machine. A machine for making such castings and forgings is shown in our U.S. Pat. No. 3,445,904 that issued May 27, 1969.

A number of advantages result from making the handlebar mounting means 14 in two separate pieces, namely: a tubular stem portion 21 and a gooseneck structure 20, which are later secured together. The gooseneck structure is a forging. The stem 21 can be originally a standard commercial tube separate from the forging and thereby relieve the manufacturer of the rather costly process of machining a one piece forging to make the bore in which will be the long tube if it were an original part of the gooseneck forging. Another advantage lies in the fact that handlebar mounting means such as 14 must be available of different lengths to suit the requirements of the cyclists of different heights. By the present system, the desired lengths of bicycle mounting means is obtained by using a tube 21 of the requisite length so that a single type of gooseneck construction 20 may be used for all different lengths of handlebar mounting means. Furthermore, by making the gooseneck separate from the stem, the subsequent forging and machining of the gooseneck is facilitated. Forging is facilitated because by this arrangement, as may be seen in FIG. 8, what is to be the top surface of the gooseneck can be made by an upper forging die that descends upon the preform towards the upper surface thereof. This result is made possible in the absence of the stem when the top surfaces that are to be forged are free of reentering angles, that is, adjacent surface portions do not have angles such as would prevent the upper dies from descending upon the top surface of the preform during the forging operation. The flash when it does occur is along the sides of the gooseneck. Of course, it can be removed, but in many instances the flash is so slight that as to be unobjectionable along the side of the forging, but it would be objectionable if it were along the to exposed surface of the forging. Likewise, by this arrangement it is possible to make the recess 22 during the forging operation as heretofore pointed out, a procedure that would not be possible if the unit were to be forged by forging dies approaching the unit from the sides.

Before the forging operation the gooseneck structure had a solid head which, after the forging operation is machined to form the bore constituting the sleeve 26 of the finished product. After the forging operation that head is also machined to form the slot 30 that defines the two ears 32-33. The portion of the gooseneck structure that constitutes the stem-receiving head is, during the forging, a solid mass of metal which is later machined to form the socket 42 and to form the bore 50 and the counter-bore 52. When the gooseneck structure 20 is in the position illustrated in FIGS. 2 and 6, the bottom part of the structure that was forged within the bottom die 91 was also free of reentering angles, that is, angles between adjacent surface parts such as would prevent movement of the preform into the cavity of the lower forging die by a straight line movement towards the die. This applies not only to the head structure that is later to receive the tubular stem 21, but applies also to the portion of the perform where the slot 30 is later to be formed to constitute the ears 32-33.

We claim:

1. A bicycle including a wheeled frame, front wheel assembly pivotally connected to the frame, handlebar means for grasping by the operator, a handlebar mounting member keyed to the front wheel assembly and to which the handlebar means is secured for steering the bicycle, the improvement wherein:
   a. said member includes a bar portion formed with an opening recess,
   b. an identification plate fixedly inset in said recess and bearing identification indicia on its outwardly facing side,
   c. said recess defining a floor surface covered by said plate and said floor surface bearing identification data,
   d. said plate side and the surrounding bar surface being subjected to mutilation by efforts to tamper with said plate indicia, and said plate side and the bar surface surrounding it are disposed on the bicycle such that when the bicycle is parked upright, said plate side and its surrounding surface present themselves for ready inspection for detection of such mutilation.

2. A structure of claim 1 wherein the recess is in the top of the bar portion and of a depth greater than the thickness of the plate, the walls of the recess extending above the plate.

3. A structure of claim 1 wherein the mounting member has a handlebar receiving head at one end and at the opposite end has a mounting stem head, said bar being between the two heads, and the recess is in the top of the bar, and (a) the surfaces of the top of said member and the tops of the adjacent side surfaces being free of reentering angles such as would prevent movement of a top forging die towards the top of the member for forging those surfaces; and (b) the surfaces of the bottom of said member and the bottoms of the adjacent side surfaces, being free of reentering angles such as would prevent movement of a bottom forging die towards and into forging engagement with the bottom of the member, thereby permitting forging of the top and the bottom surfaces of the member by the joint action of a top surface forging die and a bottom surface forging die both of which meet around the sides of the member.

4. A structure of claim 1 wherein the front wheel assembly includes a bicycle wheel fork and a tubular steering column extending into and journalled in the frame, and the handlebar mounting member includes a tubular shank that extends into the steering column and there is a wedge for wedging it in place, means for moving the wedge into its wedging position, said means comprising a wedge bolt extending from the top of the handlebar mounting member and thru the tubular shank, a nut threaded on the bottom of the bolt and movable longitudinally of the bolt by turning of the bolt, said nut moving towards and away from the wedge into and out of position bearing against the wedge, so that upon movement of the nut in one direction it moves the wedge into wedging position and upon movement of the nut in the opposite direction it receeds from the wedge leaving the wedge in its wedging position so that operation of the wedge bolt to move the nut in said opposite direction is ineffective to release the wedge and ineffective to allow withdrawal of the tubular shank.

5. A structure of claim 4 wherein the tubular shank is united with the handlebar mounting member.

6. A bicycle handlebar assembly including a tubular handlebar stem to which a handlebar is attachable, a front steering fork tube into which the tubular stem extends, means including a wedge for locking the two in a required position, means for moving the wedge into its locking position including a wedge bolt extending lengthwise through the tubular stem, characterized in that there is provided a nut threaded on the bolt and movable lengthwise of the bolt by turning of the bolt, said bolt moving the nut towards and away from the wedge into and out of position bearing against the wedge, so that upon movement of the nut in one direction it moves the wedge into wedging position and upon movement of the nut in the opposite direction it receeds from the wedge leaving the wedge in its wedging position so that operation of the wedge bolt to move the nut in said opposite direction is ineffective to release the wedge and ineffective to allow withdrawal of the tubular handlebar stem from the front steering fork tube.

7. The assembly of claim 6 further characterized in that the handlebar stem has identifying insignia thereon.

8. The assembly of claim 7 wherein there is an identification plate fixed on the stem over and concealing said insignia.

9. The assembly of claim 8 wherein the plate fits snugly within a recess in the stem with the walls of the recess surrounding and extending above the plate.

* * * * *